US008532227B2

United States Patent
Chen et al.

(10) Patent No.: US 8,532,227 B2
(45) Date of Patent: Sep. 10, 2013

(54) METHOD AND APPARATUS FOR ROBUST AND HIGH EFFICIENCY FEC FRAME HEADER RECOVERY

(75) Inventors: Hou-Shin Chen, East Brunswick, NJ (US); Wen Gao, West Windsor, NJ (US)

(73) Assignee: Thomson Licensing, Issy les Moulineaux (FR)

( * ) Notice: Subject to any disclaimer, the term of this patent is extended or adjusted under 35 U.S.C. 154(b) by 0 days.

(21) Appl. No.: 13/378,136

(22) PCT Filed: Jun. 28, 2010

(86) PCT No.: PCT/US2010/001844
§ 371 (c)(1),
(2), (4) Date: Feb. 8, 2012

(87) PCT Pub. No.: WO2011/008238
PCT Pub. Date: Jan. 20, 2011

(65) Prior Publication Data
US 2012/0128101 A1    May 24, 2012

Related U.S. Application Data

(60) Provisional application No. 61/269,753, filed on Jun. 29, 2009.

(51) Int. Cl.
*H03D 3/22* (2006.01)
*H04L 27/22* (2006.01)

(52) U.S. Cl.
USPC ............ 375/332; 375/324; 375/343; 714/751

(58) Field of Classification Search
USPC .................... 375/240.27, 324, 332, 340, 343; 714/751
See application file for complete search history.

(56) References Cited

U.S. PATENT DOCUMENTS

2004/0252725 A1 * 12/2004 Sun et al. ...................... 370/503
2009/0161788 A1    6/2009 Giraud et al.

FOREIGN PATENT DOCUMENTS

| WO | WO2010056363 | 5/2010 |
| WO | WO2010065100 | 6/2010 |
| WO | WO2010066270 | 6/2010 |

OTHER PUBLICATIONS

Paterson et al., "Efficient Decoding Algorithms for Generalized Reed-Muller Codes", IEEE Transactions on Communications, vol. 48, No. 8, Aug. 2000, 14 pages.

* cited by examiner

*Primary Examiner* — Curtis Odom
(74) *Attorney, Agent, or Firm* — Robert D. Shedd; Ronald J. Kolczynski

(57) ABSTRACT

Methods and apparatus for FEC frame header detection are provided, suitable for use in a DVB-C2 receiver. A first method comprises demodulating with a quadrature phase shift keying (QPSK) demapper, followed by correlation and symmetry measures for detection of a robust FEC header. A second method comprises demodulating with a 16 quadrature amplitude modulation (QAM) demapper, followed by correlation and symmetry measures for detection of a high efficiency FEC leader. Another embodiment comprises using both the first and second methods to find the FEC header because the first symbol of the FEC frame header may be sent either in robust mode or in high efficiency mode. There is also provided a method and apparatus for generating an alternate decision statistic for determining detection of the FEC frame header.

12 Claims, 11 Drawing Sheets

$$G = \begin{pmatrix}
1 & 1 & 1 & 1 & 1 & 1 & 1 & 1 & 1 & 1 & 1 & 1 & 1 & 1 & 1 & 1 & 1 & 1 & 1 & 1 & 1 & 1 & 1 & 1 & 1 & 1 & 1 & 1 & 1 & 1 & 1 & 1 \\
0 & 0 & 0 & 0 & 0 & 0 & 0 & 0 & 0 & 0 & 0 & 0 & 0 & 0 & 0 & 0 & 1 & 1 & 1 & 1 & 1 & 1 & 1 & 1 & 1 & 1 & 1 & 1 & 1 & 1 & 1 & 1 \\
0 & 0 & 0 & 0 & 0 & 0 & 0 & 0 & 1 & 1 & 1 & 1 & 1 & 1 & 1 & 1 & 0 & 0 & 0 & 0 & 0 & 0 & 0 & 0 & 1 & 1 & 1 & 1 & 1 & 1 & 1 & 1 \\
0 & 0 & 0 & 0 & 1 & 1 & 1 & 1 & 0 & 0 & 0 & 0 & 1 & 1 & 1 & 1 & 0 & 0 & 0 & 0 & 1 & 1 & 1 & 1 & 0 & 0 & 0 & 0 & 1 & 1 & 1 & 1 \\
0 & 0 & 1 & 1 & 0 & 0 & 1 & 1 & 0 & 0 & 1 & 1 & 0 & 0 & 1 & 1 & 0 & 0 & 1 & 1 & 0 & 0 & 1 & 1 & 0 & 0 & 1 & 1 & 0 & 0 & 1 & 1 \\
0 & 1 & 0 & 1 & 0 & 1 & 0 & 1 & 0 & 1 & 0 & 1 & 0 & 1 & 0 & 1 & 0 & 1 & 0 & 1 & 0 & 1 & 0 & 1 & 0 & 1 & 0 & 1 & 0 & 1 & 0 & 1 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 1 & 1 & 1 & 1 & 1 & 1 & 1 & 1 \\
0 & 0 & 0 & 0 & 0 & 0 & 0 & 0 & 0 & 0 & 0 & 0 & 0 & 0 & 0 & 0 & 1 & 1 & 1 & 1 & 0 & 0 & 0 & 0 & 1 & 1 & 1 & 1 & 0 & 0 & 0 & 0 \\
0 & 0 & 0 & 0 & 0 & 0 & 0 & 0 & 0 & 0 & 0 & 0 & 0 & 0 & 0 & 0 & 1 & 1 & 0 & 0 & 1 & 1 & 0 & 0 & 1 & 1 & 0 & 0 & 1 & 1 & 0 & 0 \\
0 & 0 & 0 & 0 & 0 & 0 & 0 & 0 & 0 & 0 & 0 & 0 & 0 & 0 & 0 & 0 & 1 & 0 & 1 & 0 & 1 & 0 & 1 & 0 & 1 & 0 & 1 & 0 & 1 & 0 & 1 & 0 \\
0 & 0 & 0 & 0 & 0 & 0 & 0 & 0 & 0 & 0 & 0 & 0 & 1 & 1 & 1 & 1 & 0 & 0 & 0 & 0 & 0 & 0 & 0 & 0 & 0 & 0 & 0 & 0 & 1 & 1 & 1 & 1 \\
0 & 0 & 0 & 0 & 0 & 0 & 0 & 0 & 0 & 1 & 1 & 0 & 0 & 1 & 1 & 0 & 0 & 0 & 0 & 0 & 0 & 0 & 0 & 0 & 0 & 1 & 1 & 0 & 0 & 1 & 1 & 0 \\
0 & 0 & 0 & 0 & 0 & 0 & 0 & 0 & 1 & 0 & 1 & 0 & 1 & 0 & 1 & 0 & 0 & 0 & 0 & 0 & 0 & 0 & 0 & 0 & 1 & 0 & 1 & 0 & 1 & 0 & 1 & 0 \\
0 & 0 & 0 & 0 & 0 & 0 & 1 & 1 & 0 & 0 & 0 & 0 & 1 & 1 & 0 & 0 & 0 & 0 & 0 & 0 & 1 & 1 & 0 & 0 & 0 & 0 & 0 & 0 & 1 & 1 & 0 & 0 \\
0 & 0 & 0 & 0 & 0 & 1 & 0 & 1 & 0 & 0 & 0 & 0 & 1 & 0 & 1 & 0 & 0 & 0 & 0 & 0 & 1 & 0 & 1 & 0 & 0 & 0 & 0 & 0 & 1 & 0 & 1 & 0 \\
0 & 0 & 0 & 1 & 0 & 0 & 0 & 1 & 0 & 0 & 0 & 1 & 0 & 0 & 0 & 1 & 0 & 0 & 0 & 1 & 0 & 0 & 0 & 1 & 0 & 0 & 0 & 1 & 0 & 0 & 0 & 1 \\
\end{pmatrix}$$

Figure 2

METHOD AND APPARATUS FOR ROBUST AND HIGH EFFICIENCY FEC FRAME HEADER RECOVERY

CROSS-REFERENCE TO RELATED APPLICATIONS

This application claims the benefit, under 35 U.S.C. §365 of International Application PCT/US2010/001844, filed Jun. 28, 2010 which was published in accordance with PCT Article 21(2) on Jan. 20, 2011 in English and which claims the benefit of United States provisional patent application No. 61/269,753 filed Jun. 29, 2009.

FIELD OF THE INVENTION

The present principles relate to a method for recovering a Forward Error Correction (FEC) frame header, such as used in the DVB-C2 transmission standard.

BACKGROUND OF THE INVENTION

Digital transmission techniques often use either quadrature phase shift keying (QPSK) or quadrature amplitude modulation (QAM) to modulate data. The modulated data sometimes has undergone additional encryption methods prior to modulation to make its recovery accurate and robust. The Digital Video Broadcasting (DVB) standards use QPSK and QAM techniques for data transmission.

The Digital Video Broadcasting standards consortium is a group that defines the standards for various transmission systems. One of those standards is used for digital cable transmission, the DVB-C standard. A second generation digital cable standard, the DVB-C2 standard, uses Reed-Muller encoding of information followed by mixing with a pseudo-noise (PN) sequence. A receiver needs to remove the effect of the PN sequence prior to recovery of the information bits.

A frame header of Forward Error Correction (FEC) is used in the DVB-C2 transmission Standard to support Adaptive Coding and Modulation (ACM) or Variable Coding and Modulation (VCM) in each FEC block. The FEC frame header (FECFrame) is attached in front of each FECFrame or two consecutive FECFrames to indicate the coding rate, modulation type and physical layer pipe identifier to a receiver. Thus, FECFrame detection is required in a DVB-C2 receiver. Two types of FEC frame headers can be generated in an encoder. First, in robust mode, the FEC frame header is generated using quadrature phase shift keying (QPSK). Second, in high efficiency mode, the FEC frame header is generated using 16 quadrature amplitude modulation (16-QAM). Based on the type of the FECFrame header, FECFrame detection methods and apparatus are described in this invention, suitable for use with the DVB-C2 standard.

SUMMARY OF THE INVENTION

The present principles are directed to a method and apparatus for FEC frame header detection, suitable for use in the DVB-C2 transmission standard.

According to an aspect of the present principles, there is provided a method for recovery of an FEC frame header. The method comprises the steps of demodulating a received complex data symbol, followed by computing an estimated 32-bit pseudo-noise sequence, and computing a binary correlation. The correlation output is compared to a threshold to determine whether to continue the recovery method on the current symbol or whether to demodulate the next symbol. If the method continues on the current symbol, an estimated 32-bit Reed-Muller codeword is decoded, followed by majority logic decoding on the last 10 bits of the codeword, and computation of a Reed-Muller (RM) symmetry measurement. The symmetry measurement is compared to a threshold to determine whether to continue the recovery method on the current symbol or whether to demodulate the next symbol. If the method continues on the current symbol, majority logic decoding is performed to recover the 16 information bits of the FEC header.

According to another aspect of the present principles, there is provided an apparatus. The apparatus comprises a demodulator for demodulating a received complex data symbol, for example with a demapper, circuitry for computing an estimated pseudo-noise sequence using the demodulated complex data symbol, a processor for computing a binary correlation of the estimated pseudo-noise sequence with a Reed-Muller codeword, a first comparator for comparing the binary correlation with a first threshold, a decoder for generating an estimated 32-bit RM codeword if the binary correlation is greater than or equal to the first threshold, majority logic decoding circuitry for operating on the estimated 32-bit RM codeword, circuitry for computing a RM symmetry measure, a second comparator for comparing the symmetry measure with a second threshold, and circuitry for majority logic decoding that recovers the 16 information bits of the FEC frame header.

According to another aspect of the present principles, there is provided another method for recovery of an FEC frame header. The method includes the steps of demodulating a received complex data symbol using quadrature phase shift keying (QPSK), for example with a QPSK demapper, followed by computing an estimated 32-bit pseudo-noise sequence, and computing a binary correlation. The correlation output is compared to a threshold to determine whether to continue the recovery method on the current symbol or whether to demodulate the next symbol. If the method of recovery continues on the current symbol, an estimated 32-bit Reed-Muller codeword is decoded, followed by majority logic decoding on the last 10 bits of the codeword, and computation of a Reed-Muller (RM) symmetry measurement. The symmetry measurement is compared to a threshold to determine whether to continue the recovery method on the current symbol or whether to demodulate the next symbol. If the method of recovery continues on the current symbol, majority logic decoding is performed to recover the 16 information bits of the FEC header. The method also comprises, performing in parallel with the previous steps, the steps of demodulating a received complex data symbol by 16 quadrature amplitude modulation, followed by computing an estimated 32-bit pseudo-noise sequence, and computing a binary correlation. The correlation output is compared to a threshold to determine whether to continue the recovery method on the current symbol or whether to demodulate the next symbol. If the method of recovery continues on the current symbol, an estimated 32-bit Reed-Muller codeword is decoded, followed by majority logic decoding on the last 10 bits of the codeword, and computing of a Reed-Muller (RM) symmetry measurement. The symmetry measurement is compared to a threshold to determine whether to continue the recovery method on the current symbol or whether to demodulate the next symbol. If the method of recovery continues on the current symbol, majority logic decoding is performed to recover the 16 information bits of the FEC header. Depending on whether the FEC frame header was sent in robust or high efficiency mode, the corresponding path of the two methods performed concurrently will give a decision statistic indicative of FEC frame detection. According to another aspect of the present principles, there is provided an apparatus to implement to aforementioned method.

According to another aspect of the present invention, there is provided a method for FEC frame header recovery. The method comprises the steps of demodulating a received complex data symbol using QPSK, for example using a demapper, followed by computing a soft correlation to measure the pseudo-noise sequence, followed by scaling of the soft correlation output. The scaled soft correlation output is compared to a threshold to determine whether to continue the recovery method on the current symbol or whether to demodulate the next symbol. If the method of recovery continues on the current symbol, an estimated 32-bit Reed-Muller codeword is decoded, followed by majority logic decoding on the last 10 bits of the codeword, and computing of a Reed-Muller (RM) symmetry measurement. The symmetry measurement is compared to a threshold to determine whether to continue the recovery method on the current symbol or whether to demodulate the next symbol. If the method of recovery continues on the current symbol, majority logic decoding is performed to recovery the 16 information bits of the FEC header.

According to another aspect of the present principles, there is provided an apparatus. The apparatus comprises a demodulator for demodulating a received complex data symbol, such as with a QPSK demapper, circuitry for computing a soft correlation to measure pseudo-noise sequence, a scaler for scaling the soft correlation output, a first comparator for comparing the scaled soft correlation with a first threshold, a decoder for generating an estimated 32-bit RM codeword if the scaled soft correlation is greater than or equal to the first threshold, majority logic decoding circuitry for operating on the estimated 32-bit RM codeword, circuitry for computing a RM symmetry measure, a second comparator for comparing the symmetry measure with a second threshold, and circuitry for majority logic decoding that recovers the 16 information bits of the FEC frame header.

According to another aspect of the present invention, there is provided a method of FEC frame header detection. The method comprises forming a first scaled correlation of a received data symbol with a pseudo-noise sequence, forming a second scaled correlation of a Reed-Muller codeword with a version of the received data symbol, summing the first and second scaled correlations to generate a decision statistic, and comparing the decision statistic with a threshold to determine if an FEC frame header has been detected.

According to another aspect of the present invention, there is provided an apparatus for FEC frame header detection. The apparatus comprises first and second circuits for forming scaled correlations of a received data symbol with a PN sequence and a RM codeword with a version of the received data symbol, respectively. The apparatus also comprises an adder for summing the two scaled correlations and a comparator for comparing the sum to a threshold to determine if an FEC frame header has been detected.

These and other aspects, features and advantages of the present principles will become apparent from the following detailed description of exemplary embodiments, which is to be read in connection with the accompanying drawings.

BRIEF DESCRIPTION OF THE DRAWINGS

FIG. 2 shows a generator matrix of RM(32,16) code.

DETAILED DESCRIPTION

An approach for FEC frame header processing, suitable for use in the Digital Video Broadcasting C2 broadcast standard, is described herein.

Figure 1A:
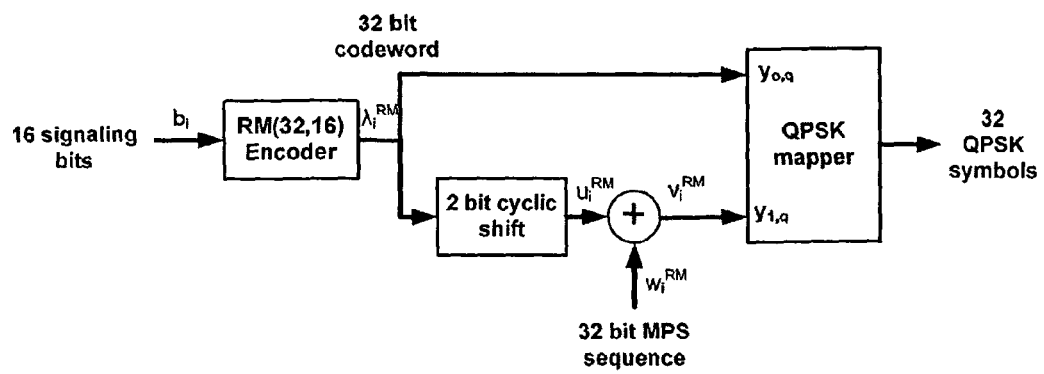
FIG. 1(a) shows an embodiment of a robust FECFrame header; 1(b) shows an embodiment of a high efficiency FECFrame header; 1(c) shows the position of the FEC frame header within a Data Slice Packet.
Figure 1B:
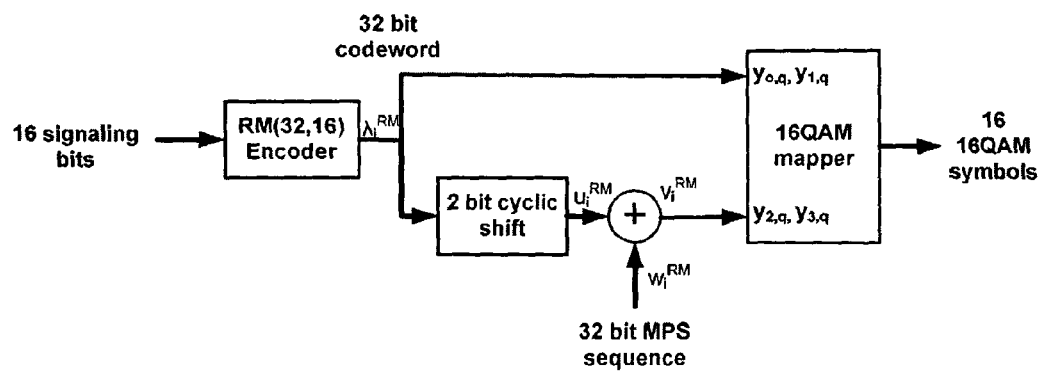
Figure 1C:
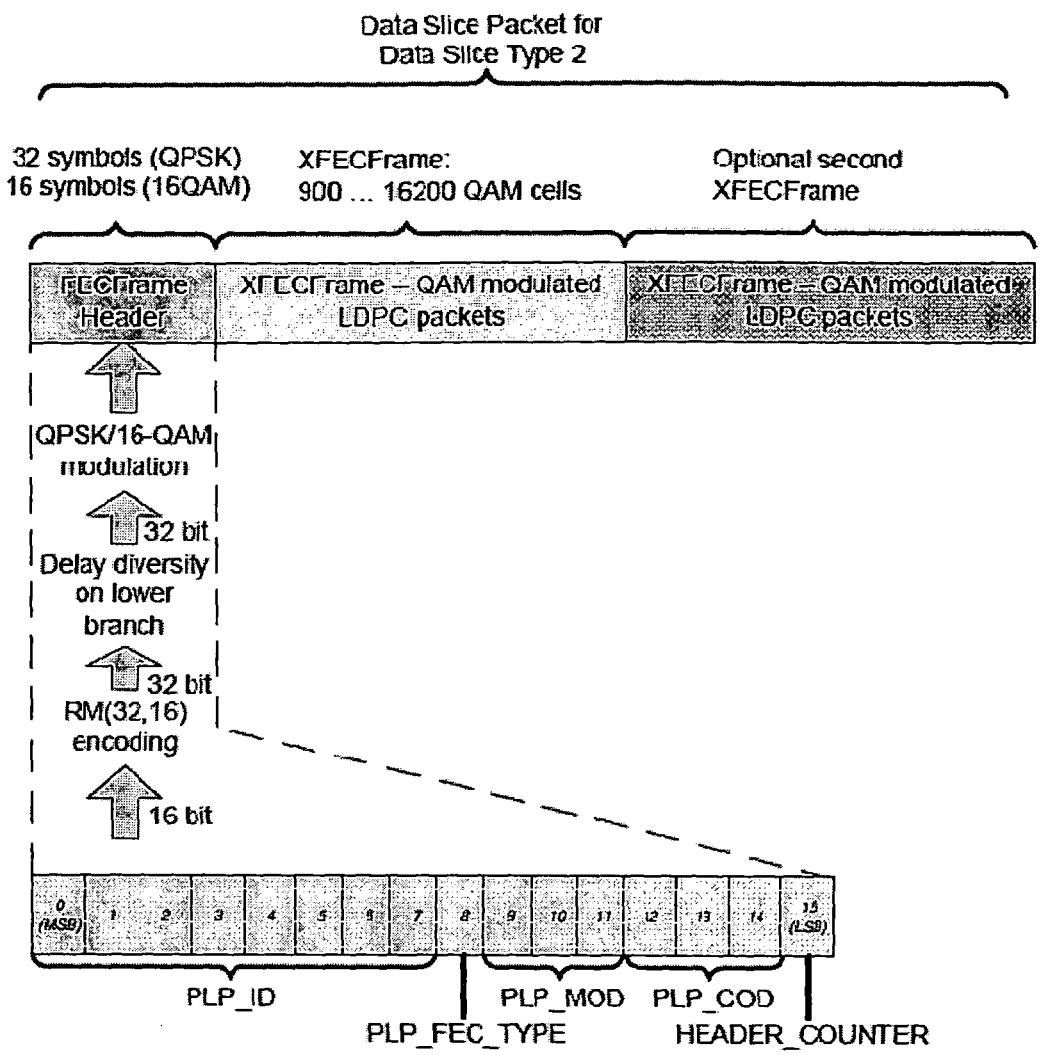

Two encoding schemes for generating an FECFrame Header are shown in the FIGS. 1(a) and 1(b). Initially the 16 bits of the L1 signaling part 1 are FEC encoded by a Reed-Muller (32,16) encoder. Subsequently each bit of the 32 bit Reed-Muller codeword is split to form an upper and a lower branch. The lower branch applies a cyclic shift within each Reed-Muller codeword and scrambles the resulting data using a specific PN sequence, called an MPS sequence. The difference in the two encoding schemes is that a QPSK constellation is used for the robust FECFrame header and a 16QAM constellation is used for the high efficiency FECFrame header. The structure of the information bits within the FEC frame header and the position of the header within a Data Slice Packet is shown in FIG. 1(c). Thus, in a receiver, from received QPSK symbols in the robust mode or received 16-QAM symbols in the high efficiency mode, to generate an estimated 32-bit RM codeword, you will need to remove the effect of PN sequence.

The robust FECFrame header detection can be performed by the following steps:

1. Assume that the 32-symbol complex sequence $(s_0, s_1, \ldots, s_{31}) = (r_i, r_{i+1}, \ldots, r_{i+31})$ is the robust FECFrame header and demodulate them into a 64-bit sequence $(a_0, a_1, \ldots, a_{63})$ by a QPSK demapper. The complex symbol, $r_i$ is a received data symbol after removing its corresponding channel gain.

2. Compute the estimated 32-bit PN sequence $\tilde{w}^{RM} = (\tilde{w}_0^{TM}, \tilde{w}_1^{RM}, \ldots, \tilde{w}_{31}^{RM})$ by $w_{(k+2)_{31}}^{RM} = \alpha_{2k} \oplus a_{(2k+5)64}$, $k=0, 1, \ldots, 31$ where $(x)_y$ is the result of x modulo y and an exclusive or operation is used.

3. Compute the binary correlation of $\tilde{w}^{RM}$ and $w^{RM}$ by $$C_P = \sum_{k=0}^{31} (2\tilde{w}_k^{RM} - 1)(2w_k^{RM} - 1).$$

The variable $w^{RM}$ represents the 32 bit scrambling sequence in the lower branch of the FEC frame header encoder that is a Reed-Muller code and $\tilde{w}^{RM}$ is the received codeword.

If $C_p < T_1$, go to step 1 and advance symbol index by 1, e.g., i=i+1.

If $C_p \geq T_1$, perform step 4.

4. Each bit of the 32-bit RM codeword is decoded by combining log-likelihood ratios of upper branch bit and its corresponding lower branch bit. After some straightforward simplifications, the estimated 32-bit RM codeword $\tilde{\lambda}=(\tilde{\lambda}_0, \tilde{\lambda}_1, \ldots, \tilde{\lambda}_-)$ is decoded by $$\tilde{\lambda}_k = \begin{cases} 0, & \text{Re}(s_k) + \text{Im}(s_{(k+2)_{32}}) \cdot (1 - 2w^{RM}_{(k+2)_{32}}) \geq 0 \\ 1, & \text{Re}(s_k) + \text{Im}(s_{(k+2)_{32}}) \cdot (1 - 2w^{RM}_{(k+2)_{32}}) < 0, \end{cases}$$
$$k = 0, 1, \ldots, 31.$$

5. The estimated 32-bit RM codeword $\tilde{\lambda}=(\tilde{\lambda}_0, \tilde{\lambda}_1, \ldots, \tilde{\lambda}_{31})$ can be decoded by a 3-stage majority-logic decoding. The last 10 bits, $(\tilde{b}_6, \tilde{b}_7, \ldots, \tilde{b}_{15})$, are decoded from the received code vector $\tilde{\lambda}=(\tilde{\lambda}_0, \tilde{\lambda}_1, \ldots, \tilde{\lambda}_{31})$ in the first stage. These 10 bits are removed from $\tilde{\lambda}$ to form a modified code vector $\tilde{\lambda}^{(1)}=\tilde{\lambda}-(0, 0, \ldots, 0, \tilde{b}_6, \tilde{b}_7, \ldots, \tilde{b}_{15}) \cdot G$.

6. The modified code vector $\tilde{\lambda}^{(1)}$ has a symmetric structure and it can be used to double confirm if the 32-symbol complex sequence $(s_0, s_1, \ldots, s_{31})$ is the FECFrame header. The RM autocorrelation of the received modified code vector is computed by $$R_{RM}(k) = \sum_{m=0}^{2^k-1} \sum_{n=0}^{2^{4-k}-1} \tilde{\lambda}^{(1)}_{m \cdot 2^{5-k}+n} \cdot \tilde{\lambda}^{(1)}_{m \cdot 2^{5-k}+2^{4-k}+n}$$

The RM symmetry measure is then computed by $$C_{RM} = \sum_{k=0}^{4} |R_{RM}(k)|.$$

If $C_{RM} < T_2$, go to step 1 and advance symbol index by 1, e.g., i=i+1.

If $C_{RM} \geq T_2$, which means FECFrame header is detected, perform step 7.

7. The first stage of majority-logic decoding is carried out in step 6. Perform the remaining two stages of majority-logic decoding procedure to obtain the 16 information bit.

The high efficiency FECFrame header detection can be performed by the following steps:

1. Assume that the 16-symbol complex sequence $(s_0, s_1, \ldots, s_{15})=(r_i, r_{i+1}, \ldots, r_{i+15})$ is the robust FECFrame header and demodulate them into a 64-bit sequence $(a_0, a_1, \ldots, a_{63})$ by a 16QAM demapper. The complex symbol, $r_i$, is a received data symbol after removing its corresponding channel gain.

2. Compute the estimated 32-bit PN sequence $\tilde{w}^{RM}=(\tilde{w}_0^{RM}, \tilde{w}_1^{RM}, \ldots, \tilde{w}_{31}^{RM})$ by $w_{(k+2)_{31}}^{RM}=a_{2k} \oplus a_{(2k+5)_{64}}$, k=0, 1, ..., 31 where $(x)_y$ is the result of x modulo y.

3. Compute the binary correlation of $\tilde{w}^{RM}$ and $w^{RM}$ by $$Cp = \sum_{k=0}^{31} (2\tilde{w}_k^{RM} - 1)(2w_k^{RM} - 1).$$

If $C_p < T_1$, go to step 1 and advance symbol index by 1, e.g., i=i+1.
If $C_p \geq T_1$, perform step 4.

4. Each bit of the 32-bit RM codeword is decoded by combining log-likelihood ratios of upper branch bit and its corresponding lower branch bit. After some straightforward simplifications, the estimated 32-bit RM codeword $\tilde{\lambda}=(\tilde{\lambda}_0, \tilde{\lambda}_1, \ldots, \tilde{\lambda}_{31})$ is decoded by computing k=0, 1, ..., 15:

$$x_k^{+1} = \exp\left[\frac{-(\text{Re}(s_k) - 1/\sqrt{10})^2}{\sigma^2}\right], x_k^{+3} = \exp\left[\frac{-(\text{Re}(s_k) - 3/\sqrt{10})^2}{\sigma^2}\right],$$

$$x_k^{-1} = \exp\left[\frac{-(\text{Re}(s_k) + 1/\sqrt{10})^2}{\sigma^2}\right], x_k^{-3} = \exp\left[\frac{-(\text{Re}(s_k) + 3/\sqrt{10})^2}{\sigma^2}\right],$$

$$y_k^{+1} = \exp\left[\frac{-(\text{Im}(s_k) - 1/\sqrt{10})^2}{\sigma^2}\right], y_k^{+3} = \exp\left[\frac{-(\text{Im}(s_k) - 3/\sqrt{10})^2}{\sigma^2}\right],$$

$$y_k^{-1} = \exp\left[\frac{-(\text{Im}(s_k) + 1/\sqrt{10})^2}{\sigma^2}\right], y_k^{-3} = \exp\left[\frac{-(\text{Im}(s_k) + 3/\sqrt{10})^2}{\sigma^2}\right]$$

$$\tilde{\lambda}_{2k} = \begin{cases} 0, & \log\frac{x_k^{-1}+x_k^{-3}}{x_k^{+1}+x_k^{+3}} + (1 - 2w^{RM}_{(2k+2)_{32}}) \cdot \log\frac{x_{(k+1)_{16}}^{-1}+x_{(k+1)_{16}}^{+1}}{x_{(k+1)_{16}}^{-3}+x_{(k+1)_{16}}^{+3}} < 0 \\ 1, & \log\frac{x_k^{-1}+x_k^{-3}}{x_k^{+1}+x_k^{+3}} + (1 - 2w^{RM}_{(2k+2)_{32}}) \cdot \log\frac{x_{(k+1)_{16}}^{-1}+x_{(k+1)_{16}}^{+1}}{x_{(k+1)_{16}}^{-3}+x_{(k+1)_{16}}^{+3}} \geq 0 \end{cases}$$

$$\tilde{\lambda}_{2k+1} = \begin{cases} 0, & \log\frac{y_k^{-1}+y_k^{-3}}{y_k^{+1}+y_k^{+3}} + (1 - 2w^{RM}_{(2k+3)_{32}}) \cdot \log\frac{y_{(k+1)_{16}}^{-1}+y_{(k+1)_{16}}^{+1}}{y_{(k+1)_{16}}^{-3}+y_{(k+1)_{16}}^{+3}} < 0 \\ 1, & \log\frac{y_k^{-1}+y_k^{-3}}{y_k^{+1}+y_k^{+3}} + (1 - 2w^{RM}_{(2k+3)_{32}}) \cdot \log\frac{y_{(k+1)_{16}}^{-1}+y_{(k+1)_{16}}^{+1}}{y_{(k+1)_{16}}^{-3}+y_{(k+1)_{16}}^{+3}} \geq 0 \end{cases}$$

where $\sigma^2$ is the estimated variance of noise.

5. The estimated 32-bit RM codeword $\tilde{\lambda}=(\tilde{\lambda}_0, \tilde{\lambda}_1, \ldots, \tilde{\lambda}_{31})$ can be decoded by a 3-stage majority-logic decoding. The last 10 bits, $(\tilde{b}_6, \tilde{b}_7, \ldots, \tilde{b}_{15})$, are decoded from the received code vector $\tilde{\lambda}=(\tilde{\lambda}_0, \tilde{\lambda}_1, \ldots, \tilde{\lambda}_{31})$ in the first stage. These 10 bits are removed from $\tilde{\lambda}$ to form a modified code vector $\tilde{\lambda}^{(1)}=\tilde{\lambda}-(0, 0, \ldots, 0, \tilde{b}_6, \tilde{b}_7, \ldots, \tilde{b}_{15}) \cdot G$.

6. The modified code vector $\tilde{\lambda}^{(1)}$ has a symmetric structure and it can be used to double confirm if the 32-symbol complex sequence $(s_0, s_1, \ldots, s_{31})$ is the FECFrame header. The RM autocorrelation of the received modified code vector is computed by $$R_{RM}(k) = \sum_{m=0}^{2^k-1} \sum_{n=0}^{2^{4-k}-1} (2 \cdot \tilde{\lambda}^{(1)}_{m \cdot 2^{5-k}+n} - 1) \cdot (2 \cdot \tilde{\lambda}^{(1)}_{m \cdot 2^{5-k}+2^{4-k}+n} - 1)$$

The RM symmetry measure is then computed by $$C_{RM} = \sum_{k=0}^{4} |R_{RM}(k)|.$$

If $C_{RM} < T_2$, go to step 1 and advance symbol index by 1, e.g., i=i+1.

If $C_m \geq T_2$, which means FECFrame header is detected, perform step 7.

7. The first stage of majority-logic decoding is carried out in step 6. Perform the remaining 2 stages of majority-logic decoding procedure to obtain the 16 information bit.

Because the FECFrame header mode is unknown, two possible modes should be tried in each symbol index i, i.e., assuming $r_i$ is the first symbol of the FECFrame header in robust mode or in high efficiency mode.

In the robust FECFrame header mode, it is possible to use a soft correlation to replace steps 2 and 3. We can use $$C_{p,soft} = \sum_{k=0}^{31} \text{Re}(s_k) \cdot \text{Im}(s_{(k+2)_{32}}) \cdot (2 \cdot w_{(k+2)_{32}} - 1)$$

which is a soft correlation between $\tilde{w}^{RM}$ and $w^{RM}$, as a measure of the PN sequence. When the soft correlation is used in combination with the RM symmetry measure, a scaling is required.

The modified code vector $\tilde{\lambda}^{(1)} = \tilde{\lambda} - (0, 0, \ldots, \tilde{b}_6, \tilde{b}_7, \ldots, \tilde{b}_{15}) \cdot G$ has a symmetric structure because for the transmitted 32-bit RM code vector $\lambda$, $\lambda^{(1)}$ is a linear combination of the first 6 rows of the generator matrix and these 6 rows have a symmetric structure.

The decision of the FECFrame header detection is made by two stages in steps 3 and 7. The decision statistic can also be formed by $C = \alpha_1 C_p + \alpha_2 C_{RM}$, where $\alpha_1$ and $\alpha_2$ are combining coefficients. That means, in step 3 of the detection, no matter what value of $C_p$, the detection procedures are performed to step 6 and use $C$ and a threshold $T_3$ to determine if it is a FECFrame header. If $\alpha_1 = 0$, it means that steps 2 and 3 are skipped and only the RM symmetry measure is used to make decision. If $\alpha_2 = 0$, it means that step 6 is skipped and only the PN correlation is used to make decision.

The RM symmetry measure can be computed by $$C_{RM} = \sum_{k=0}^{K} |R_{RM}(k)|,$$

$K = 0, 1, 2, 3,$ or $4$. The larger the number of K, the more robust the RM symmetry measure. In addition, any combination of $|R_{RM}(k)|$ can be used as a RM symmetry measure.

Figure 3:
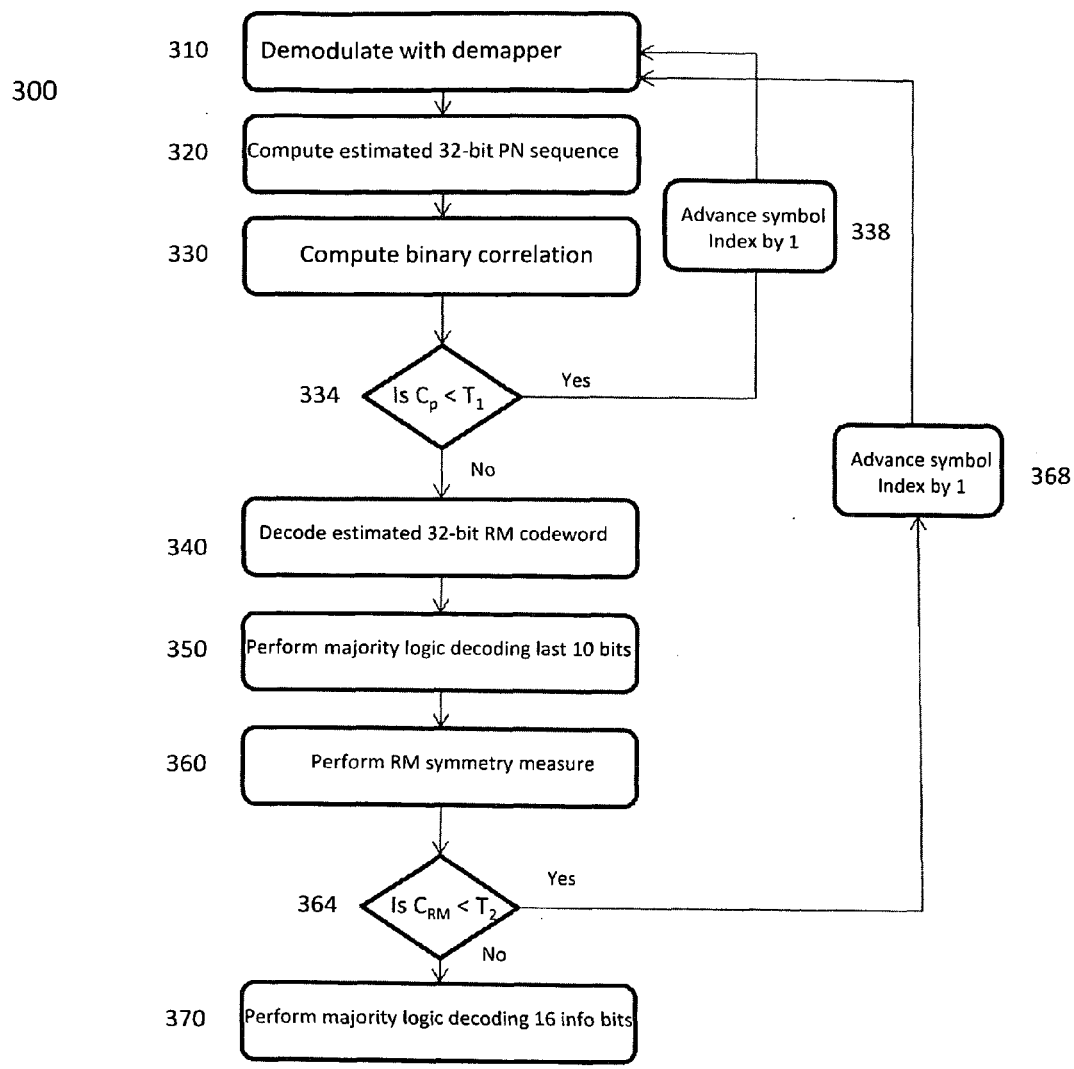
FIG. 3 shows a flow diagram of one embodiment of a method for FEC header recovery under the present principles.

One embodiment of the present principles is illustrated in FIG. 3, which shows a method for FEC frame header detection. A received complex data symbol is demodulated with a demapper in step 310. The demodulated output is used to compute an estimated 32-bit PN sequence in step 320. The binary correlation of the estimated 32-bit PN sequence is taken in step 330 and the correlation output is compared to a first threshold in step 334. If the correlation is less than the first threshold value, the symbol index is increased by 1 in step 338 and the process goes back to demodulation of the next symbol in step 310. If the correlation is greater than or equal to the first threshold, each bit of the 32-bit RM codeword is decoded by combining log-likelihood ratios of the upper branch bits with their corresponding lower branch bits to produce an estimated 32-bit RM codeword in step 340. The first stage of majority logic decoding is performed in step 350 to produce 10 bits of a modified code vector. This modified code vector is used in step 360 to double confirm if the 32-symbol complex data symbol is the FEC frame header by performing an autocorrelation. If the autocorrelation value is less than a second threshold as checked in step 364, the symbol index is increased in step 368 and demodulation of the next symbol is performed by proceeding back to step 310. If the correlation is greater than or equal to the second threshold, the remaining two stages of majority logic decoding is performed in step 370 to obtain the 16 information bits of the FEC frame header.

Figure 4:
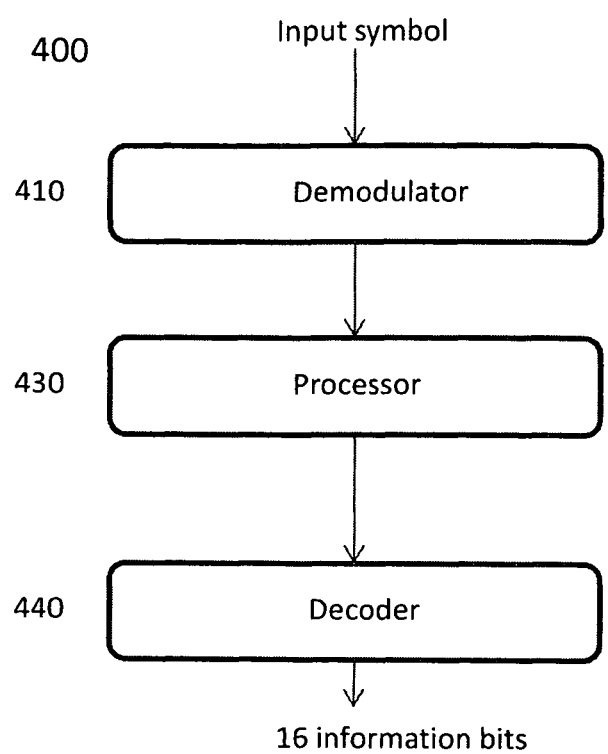
FIG. 4 shows an apparatus to recover an FEC header under the present principles.

Another embodiment of the present principles is illustrated in FIG. 4, which shows an apparatus for FEC frame header detection. A received complex data symbol is demodulated with a demodulator 410. The demodulated output is in signal communication with processor 430 which is used to compute an estimated 32-bit PN sequence and also to compute the binary correlation of the estimated 32-bit PN sequence. The correlation output is compared to a first threshold by processor 430. If the correlation is less than the first threshold value, the symbol index is increased and demodulation of the next symbol is performed by demodulator 410. If the correlation is greater than or equal to the first threshold, each bit of the 32-bit RM codeword is decoded by combining log-likelihood ratios of the upper branch bits with their corresponding lower branch bits to produce an estimated 32-bit RM codeword by decoder 440, which is in signal communication with processor 430 output and its comparator signal output. The first stage of majority logic decoding is performed by decoder 440 which produces 10 bits of a modified code vector. This modified code vector is used by decoder 440 to calculate a RM symmetry measure to double confirm if the 32-symbol complex data symbol is the FEC frame header by performing an autocorrelation. If the autocorrelation value is less than a second threshold as checked by decoder 440, the symbol index is increased and demodulation of the next symbol is performed by demodulator 410. If the correlation is greater than or equal to the second threshold, the remaining two stages of majority logic decoding is performed by decoder 440 to obtain the 16 information bits of the FEC frame header.

Figure 5:
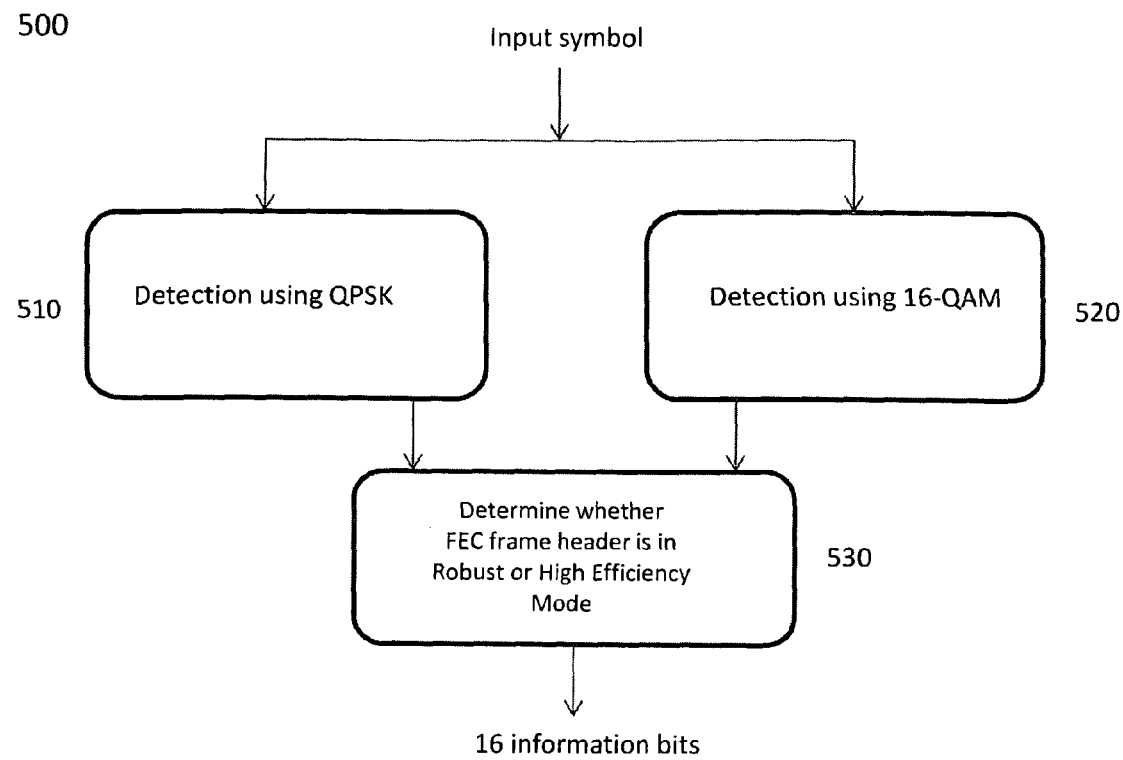
FIG. 5 shows a method for FEC header recovery under the present principles for either robust or high efficiency mode.

Another embodiment of the present principles is illustrated in FIG. 5, which shows a method for FEC frame header detection. The method comprises using the aforementioned detection method that uses QPSK demodulation in step 510 concurrently with the method of detection using 16-QAM demodulation in step 520. A determination is made in step 530 to decide whether the FEC frame header has been detected in either robust or in high efficiency mode.

Figure 6:
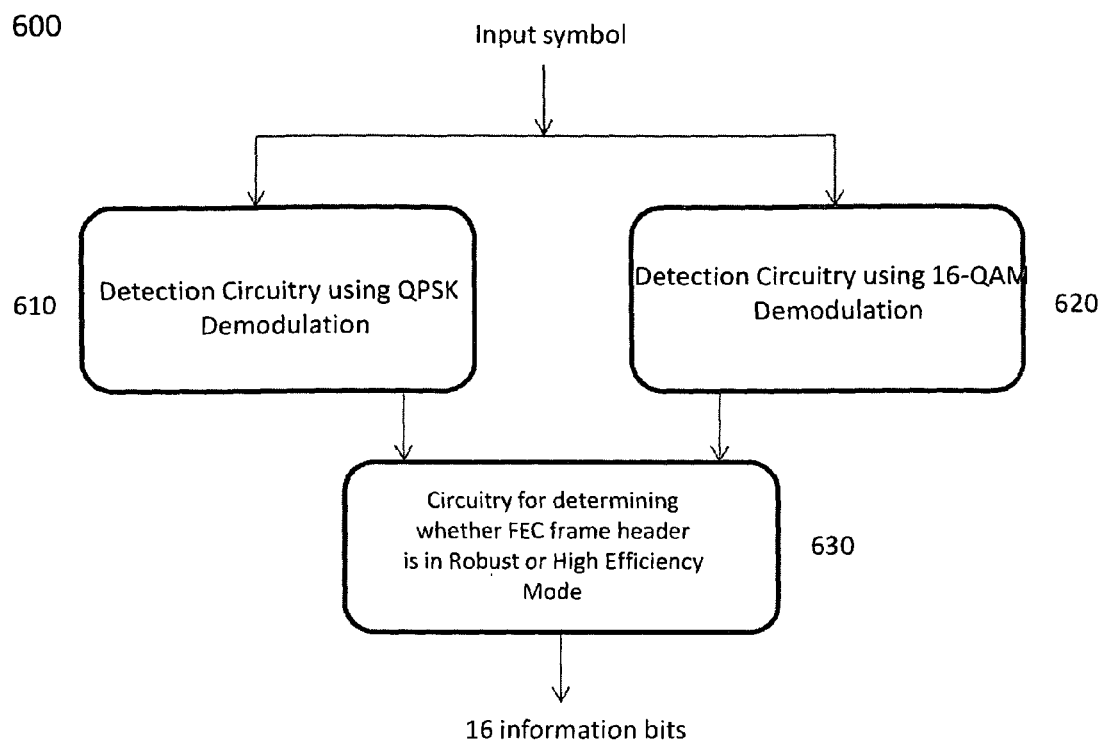
FIG. 6 shows an apparatus to recover an FEC header under the present principles using either robust or high efficiency mode.

Another embodiment of the present principles is illustrated in FIG. 6, which shows an apparatus. The apparatus is comprised of the detection circuitry 610 that uses QPSK demodulation and the detection circuitry 620 that uses 16-QAM demodulation. The outputs of these circuits are in signal communication with circuitry 630 that detects the FEC frame header in robust or in high efficiency mode.

Figure 7:
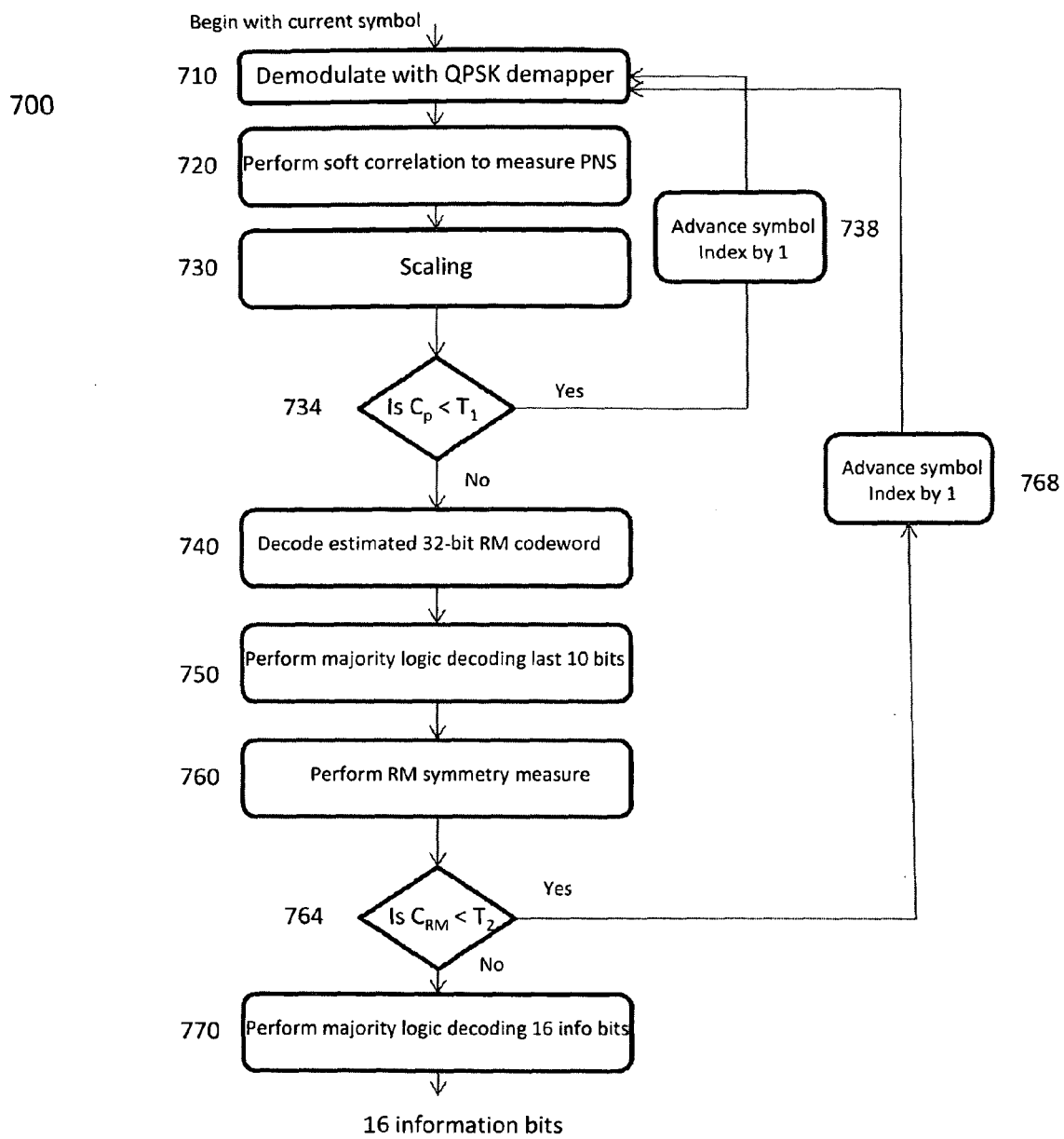
FIG. 7 shows a method for FEC header recovery using the robust mode and a soft correlation.

One embodiment of the present principles is illustrated in FIG. 7, which shows a method for FEC frame header detection 700. A received complex data symbol is demodulated with a QPSK demapper in step 710. The demodulated output is used to compute a soft correlation in step 720. The soft correlation is scaled in step 730 and the scaled soft correlation output is compared to a first threshold in step 734. If the correlation is less than the first threshold value, the symbol index is increased by 1 in step 338 and the process goes back to demodulation of the next symbol in step 710. If the correlation is greater than or equal to the first threshold, each bit of the 32-bit RM codeword is decoded by combining log-likelihood ratios of the upper branch bits with their corresponding lower branch bits to produce an estimated 32-bit RM codeword in step 740. The first stage of majority logic decoding is performed in step 750 to produce 10 bits of a modified code vector. This modified code vector is used in step 760 to double confirm if the 32-symbol complex data symbol is the FEC frame header by performing an autocorrelation. If the autocorrelation value is less than a second threshold as checked in step 764, the symbol index is increased in step 768 and demodulation of the next symbol is performed by proceeding back to step 710. If the correlation is greater than or equal to the second threshold, the remaining two stages of majority logic decoding is performed in step 770 to obtain the 16 information bits of the FEC frame header.

Figure 8:
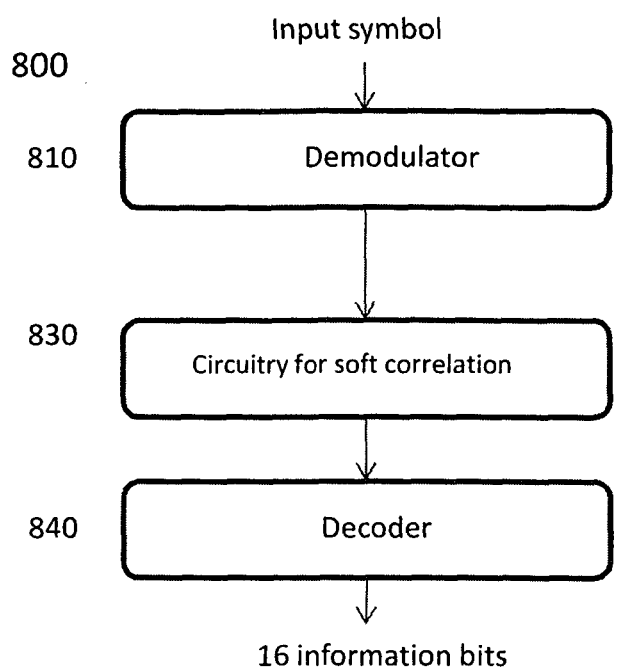
FIG. 8 shows an apparatus for FEC header recovery using the robust mode and a soft correlation.

Another embodiment of the present principles is illustrated in FIG. 8, which shows an apparatus for FEC frame header detection 800. A received complex data symbol is demodulated with a demodulator 810. The demodulated output is in signal communication with circuitry 830 and is used to compute a soft correlation. The soft correlation is scaled by scaler within circuitry 830 and the correlation output is compared to a first threshold within circuitry 830. If the correlation is less than the first threshold value, the symbol index is increased and demodulation of the next symbol is performed by demodulator 810. If the correlation is greater than or equal to the first threshold, each bit of the 32-bit RM codeword is decoded by combining log-likelihood ratios of the upper branch bits with their corresponding lower branch bits to produce an estimated 32-bit RM codeword by decoder 840, which is in signal communication with circuitry 830 output and its comparison output. The first stage of majority logic decoding is performed by circuitry 840 which produces 10 bits of a modified code vector. This modified code vector is used by a RM symmetry circuit within decoder 840 to double confirm if the 32-symbol complex data symbol is the FEC frame header by performing an autocorrelation. If the autocorrelation value is less than a second threshold as checked by a second comparator within decoder 840, the symbol index is increased and demodulation of the next symbol is performed by demodulator 810. If the correlation is greater than or equal to the second threshold, the remaining two stages of majority logic decoding is performed by decoder 840 to obtain the 16 information bits of the FEC frame header.

Figure 9:
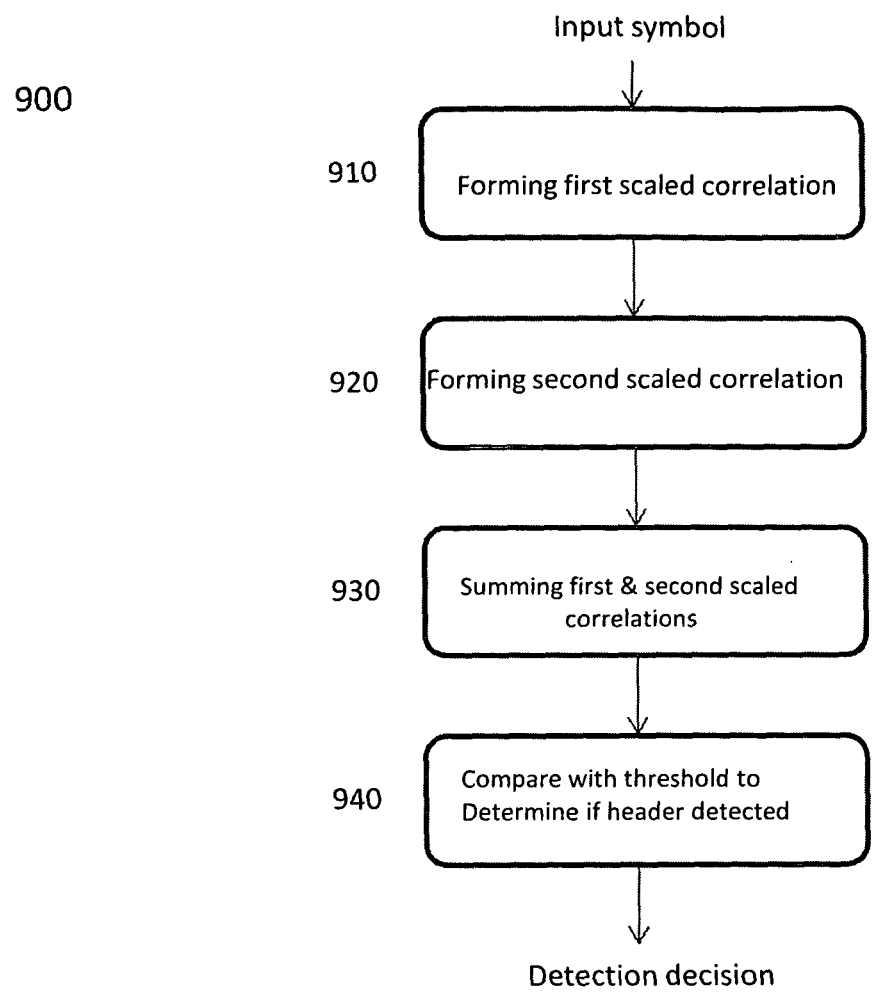
FIG. 9 shows a method for determining an FEC header decision statistic under the present principles.

Another aspect of the present principles is illustrated in FIG. 9, which shows a method 900 for forming a decision statistic for FEC frame header detection. A first scaled correlation is formed in step 910, followed by forming a second scaled correlation in step 920. The scaled correlation outputs are next summed in step 930 and compared with a threshold to determine if an FEC frame header has been detected in step 940.

Figure 10:
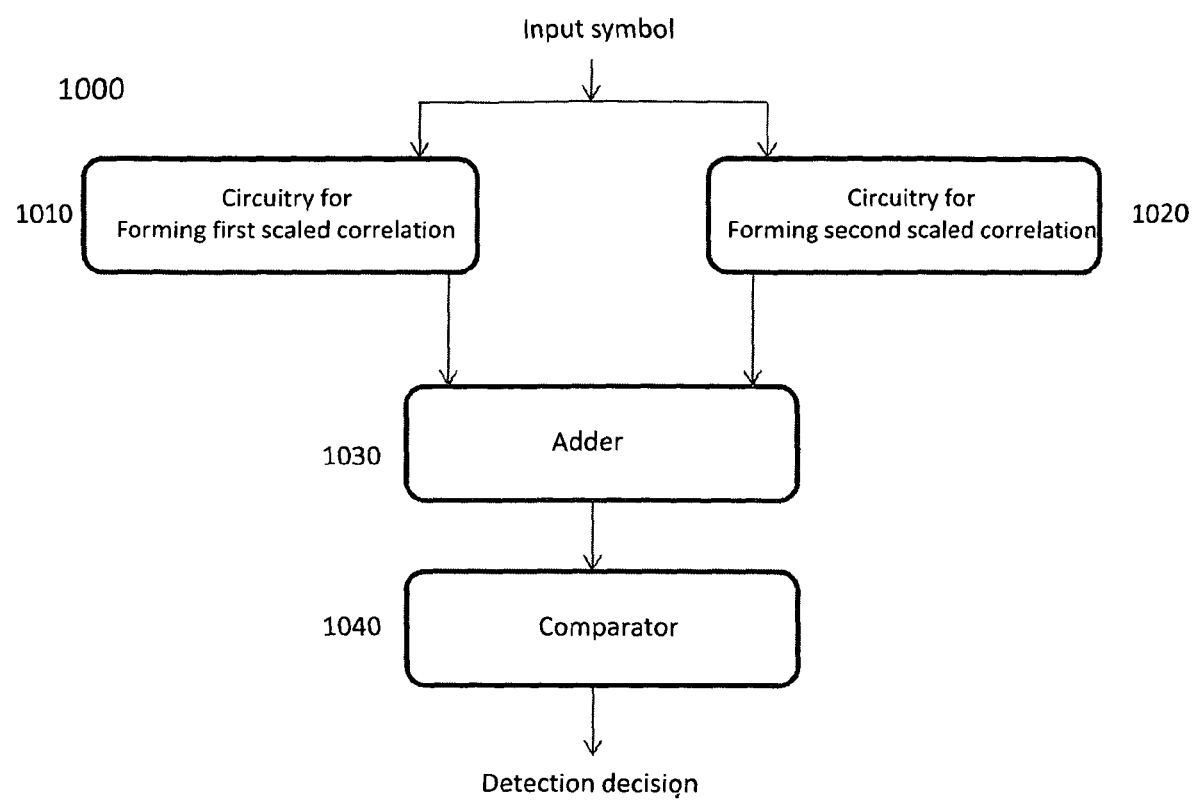
FIG. 10 shows an apparatus for determining an FEC header decision statistic under the present principles.

Another aspect of the present principles is illustrated in FIG. 10, which shows an apparatus 1000 for forming a decision statistic for FEC frame header detection. Circuitry 1010 for forming a first scaled correlation and circuitry 1020 for forming a second scaled correlation are in signal communication with an adder 1030 which sums the scaled correlation circuitry outputs. The adder output is in signal communication with a comparator 1040 that compares the adder output with a threshold to determine if an FEC frame header has been detected.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

The present description illustrates the present principles. It will thus be appreciated that those skilled in the art will be able to devise various arrangements that, although not explicitly described or shown herein, embody the present principles and are included within its spirit and scope.

All examples and conditional language recited herein are intended for pedagogical purposes to aid the reader in understanding the present principles and the concepts contributed by the inventor(s) to furthering the art, and are to be construed as being without limitation to such specifically recited examples and conditions.

Moreover, all statements herein reciting principles, aspects, and embodiments of the present principles, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the present principles. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The present principles as defined by such claims reside in the fact that the functionalities provided by the various recited means are combined and brought together in the manner which the claims call for. It is thus regarded that any means that can provide those functionalities are equivalent to those shown herein.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

In conclusion, methods and apparatus for FEC frame header detection have been provided which detect the FEC frame header in both robust and high efficiency modes. Under the principles described herein, both methods may employed to determine if the FEC frame header has been sent in robust mode or in high efficiency mode. There is also provided a method and apparatus for FEC frame header detection in the robust mode using a soft correlation. There is also provided a method and apparatus for generating a decision statistic for FEC frame header detection.

The invention claimed is:

1. A method for processing FEC frame header data, comprising:
    demodulating a received complex data symbol;
    computing an estimated pseudo-noise sequence using the demodulated complex data symbol;
    computing a binary correlation of the estimated pseudo-noise sequence with a Reed-Muller codeword;
    comparing the binary correlation with a first threshold to determine if a next received complex data symbol should be demodulated;
    decoding an estimated Reed-Muller codeword from said demodulated complex data symbol if said binary correlation is equal or greater than the first threshold;
    performing majority logic decoding on the estimated Reed-Muller codeword;
    computing a Reed-Muller symmetry measure on said estimated Reed-Muller codeword;
    comparing said symmetry measure with a second threshold to determine if a next received complex data symbol should be demodulated; and
    performing majority logic decoding to produce frame header data if said symmetry measure is greater than or equal to the second threshold.

2. The method of claim 1, wherein the demodulating step is performed with a quadrature phase shift keying demapper.

3. The method of claim 1, wherein the demodulating step is performed with a 16 quadrature amplitude modulation demapper.

4. An apparatus for processing FEC frame header data, comprising:
    a demodulator for demodulating a received complex data symbol with a demapper;
    a processor for computing an estimated pseudo-noise sequence using the demodulated complex data symbol;
    circuitry for computing a binary correlation of the estimated pseudo-noise sequence with a Reed-Muller codeword;
    a first comparator for comparing the binary correlation with a first threshold to determine if a next received complex data symbol should be demodulated;
    a decoder for decoding an estimated 32-bit Reed-Muller codeword if said binary correlation is equal or greater than the first threshold;
    circuitry for performing a first stage of majority logic decoding on the estimated 32-bit Reed-Muller codeword;
    circuitry for computing a Reed-Muller symmetry measure;
    a second comparator for comparing said symmetry measure with a second threshold to determine if a next received complex data symbol should be demodulated; and
    circuitry for performing remaining stages of majority logic decoding on the estimated 32-bit Reed-Muller codeword to produce frame header data if said symmetry measure is at least as great as the second threshold.

5. The apparatus of claim 4, wherein the demodulator uses a quadrature phase shift keying demapper.

6. The apparatus of claim 4, wherein the demodulator uses a 16 quadrature amplitude modulation demapper.

7. A method for processing FEC frame header data, comprising:
    demodulating a received complex data symbol using quadrature phase shift keying (QPSK);
    computing a first estimated pseudo-noise sequence using the QPSK demodulated complex data symbol;
    computing a first binary correlation of the first estimated pseudo-noise sequence with a Reed-Muller codeword;
    comparing the first binary correlation with a first threshold to determine if a next received complex data symbol should be demodulated;
    decoding a first estimated Reed-Muller codeword from said demodulated complex data symbol if said first binary correlation is equal or greater than the first threshold;
    performing majority logic decoding on the first estimated Reed-Muller codeword;
    computing a first Reed-Muller symmetry measure on said estimated Reed-Muller codeword;
    comparing said first Reed-Muller symmetry measure with a second threshold to determine if a next received complex data symbol should be demodulated; and
    performing majority logic decoding to produce a first set of frame header data if said first Reed-Muller symmetry measure is greater than or equal to the second threshold;
    demodulating the received complex data symbol using 16 quadrature amplitude modulation (QAM);
    computing a second estimated pseudo-noise sequence using the QAM demodulated complex data symbol;
    computing a second binary correlation of the second estimated pseudo-noise sequence with a Reed-Muller codeword;
    comparing the second binary correlation with a third threshold to determine if a next received complex data symbol should be demodulated;
    decoding a second estimated Reed-Muller codeword if said second binary correlation is equal or greater than the third threshold;
    performing majority logic decoding on the second estimated Reed-Muller codeword;
    computing a second Reed-Muller symmetry measure on said second estimated Reed-Muller codeword;
    comparing said second symmetry measure with a fourth threshold to determine if a next received complex data symbol should be demodulated; and
    performing majority logic decoding to produce a second set of frame header data if said second Reed-Muller symmetry measure is greater than or equal to the fourth theshold;
    extracting said FEC header from either the first set of frame header data or the second set of frame header data depending on which was produced without demodulating a next received complex data symbol.

8. An apparatus to execute the method of claim 7.

9. A method for processing FEC frame header data, comprising:
    demodulating a received complex data symbol with a quadrature amplitude modulation demapper;
    performing a soft correlation to measure a pseudo-noise sequence;
    scaling the output of said soft correlation;
    comparing the scaled soft correlation output with a first threshold to determine if a next received complex data symbol should be demodulated;
    decoding an estimated Reed-Muller codeword if said scaled soft correlation is equal or greater than the first threshold;
    performing majority logic decoding on the estimated 32-bit Reed-Muller codeword;
    computing a Reed-Muller symmetry measure on said estimated Reed-Muller codeword;

comparing said Reed-Muller symmetry measure with a second threshold to determine if a next received complex data symbol should be demodulated; and performing majority logic decoding to produce frame header data if said second Reed-Muller symmetry measure is greater than or equal to the second threshold.

10. An apparatus for processing FEC frame header data, comprising:

a demodulator for demodulating a received complex data symbol with a quadrature amplitude modulation demapper;

circuitry for performing a soft correlation to measure a pseudo-noise sequence;

circuitry for scaling the output of said soft correlation;

circuitry for performing a first comparison of the scaled soft correlation output with a first threshold to determine if a next received complex data symbol should be demodulated;

a decoder for decoding an estimated 32-bit Reed-Muller codeword if said scaled soft correlation is equal or greater than the first threshold;

circuitry for performing majority logic decoding on the estimated 32-bit Reed-Muller codeword;

circuitry for computing a Reed-Muller symmetry measure;

circuitry for performing a second comparison of the said symmetry measure with a second threshold to determine if a next received complex data symbol should be demodulated; and circuitry for performing remaining stages of majority logic decoding on the estimated 32-bit Reed-Muller codeword to produce frame header data if said symmetry measure is at least as great as the second threshold.

11. A method of FEC header detection, comprising:

forming a first scaled correlation of a received data symbol with a pseudo-noise sequence;

forming a second scaled correlation of a Reed-Muller codeword with a version of the received data symbol;

summing the first scaled correlation and the second scaled correlation to generate a decision statistic; and comparing the decision statistic with a threshold to determine if an FEC frame header has been detected.

12. An apparatus for FEC header detection, comprising:

a first circuit for forming a first scaled correlation of a received data symbol with a pseudo-noise sequence;

a second circuit for forming a second scaled correlation of a Reed-Muller codeword with a version of the received data symbol;

an adder for summing the first scaled correlation and the second scaled correlation to generate a decision statistic; and a comparator for comparing the decision statistic with a threshold to determine if an FEC frame header has been detected.

* * * * *